United States Patent
Fujinaga

(10) Patent No.: US 8,988,448 B2
(45) Date of Patent: Mar. 24, 2015

(54) IMAGE GENERATION METHOD FOR PERFORMING COLOR CONVERSION ON AN IMAGE

(75) Inventor: Seiya Fujinaga, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1093 days.

(21) Appl. No.: 12/138,826

(22) Filed: Jun. 13, 2008

(65) Prior Publication Data

US 2008/0316223 A1 Dec. 25, 2008

(30) Foreign Application Priority Data

Jun. 19, 2007 (JP) ................. 2007-161953

(51) Int. Cl.
*G09G 5/02* (2006.01)
*H04N 1/60* (2006.01)

(52) U.S. Cl.
CPC .............. *G09G 5/02* (2013.01); *H04N 1/6011* (2013.01); *G09G 2320/0606* (2013.01); *G09G 2320/0666* (2013.01)
USPC ....................................................... 345/589

(58) Field of Classification Search
USPC ........... 345/589–595; 358/500–540; 382/162, 382/167
See application file for complete search history.

(56) References Cited

U.S. PATENT DOCUMENTS

| 7,145,571 B2* | 12/2006 | Jones et al. .................. 345/589 |
| 2001/0053246 A1* | 12/2001 | Tachibana et al. ............ 382/162 |
| 2006/0049245 A1* | 3/2006 | Fujinaga ....................... 235/382 |
| 2006/0061586 A1* | 3/2006 | Brulle-Drews et al. ....... 345/594 |
| 2006/0290712 A1 | 12/2006 | Hong et al. |
| 2007/0195345 A1* | 8/2007 | Martinez et al. .............. 358/1.9 |

FOREIGN PATENT DOCUMENTS

| JP | 2002-55671 A | 2/2002 |
| JP | 2002-137499 A | 5/2002 |
| JP | 2004-200955 A | 7/2004 |
| JP | 2004-272516 A | 9/2004 |
| WO | 2004-036447 A1 | 4/2004 |

OTHER PUBLICATIONS

Ted Kuik; "Choosing Good Font/Background Combinations"; Oct. 26, 2004; pp. 1-2; http://www.coolnotions.com/Articles/Article_01.htm.*

* cited by examiner

*Primary Examiner* — Devona Faulk
*Assistant Examiner* — Peter Hoang
(74) *Attorney, Agent, or Firm* — Canon USA Inc. IP Division

(57) ABSTRACT

A plurality of samples having different pairs of a background color and a text color, and entry fields provided in correspondence with the individual samples and configured to be filled in by a user are printed on a sheet. After the user has filled in the sheet, the sheet is read and analyzed, and color conversion based on the analysis result is performed. The user can view the samples printed on the sheet and can select one of the samples. Thus, even if default colors used for displaying or printing are colors that are difficult to distinguish for the user, the default colors can be reliably changed into desired colors to perform displaying or printing.

16 Claims, 10 Drawing Sheets

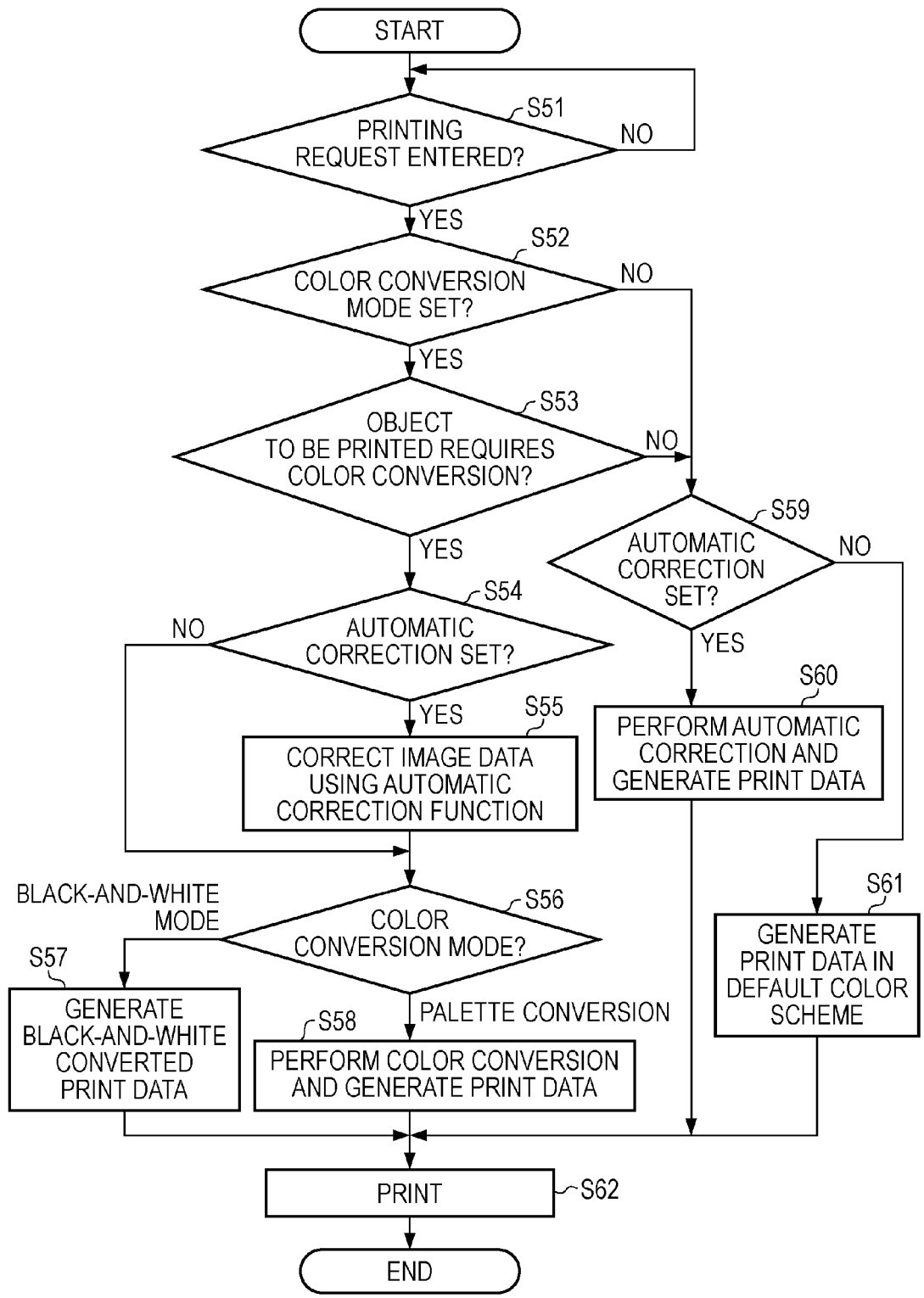

IMAGE GENERATION METHOD FOR PERFORMING COLOR CONVERSION ON AN IMAGE

BACKGROUND OF THE INVENTION

1. Field of the Invention

The present invention relates to an image generation method for performing color conversion on an image.

2. Description of the Related Art

Users with any impairment in color vision wherein colors appear indistinguishable may find it difficult to identify material displayed on a display unit of a product or printed material.

Even users who do not have a problem in distinguishing between colors may be less able to distinguish between color tones. To address this issue, for example, the following techniques have been proposed.

Japanese Patent Laid-Open No. 2002-55671 describes a technique in which a portion of display data that is to be subjected to color conversion is determined so that color conversion can be performed only on the determined portion. This technique allows color conversion only for a desired portion of display data while preventing color conversion for an unnecessary portion to display an image having desired high reproducibility, such as a photograph.

Japanese Patent Laid-Open No. 2006-509223 (Translation of PCT Application) describes a technique in which color vision impairment information is input by a user and color conversion is performed according to the input information. The color vision impairment information includes information indicating what color is indistinguishable to the user, and information indicating how indistinguishable that color is.

The technique described in Japanese Patent Laid-Open No. 2002-55671, however, has a problem in that performing color conversion to provide easy-to-read material for each user is not straightforward. The severity of color vision impairment differs from person to person, and it is difficult to uniquely determine whether to perform color conversion.

In the technique described in Japanese Patent Laid-Open No. 2006-509223 (Translation of PCT Application), a user inputs color vision impairment information through an operation unit. The user does not specify a desired visual representation but only inputs color vision impairment information. Therefore, it is not easy for a user who does not understand their vision impairment characteristic to input color vision impairment information. In some cases, conversion of indistinguishable colors into desired colors may fail to be achieved.

In particular, users having difficulty in identifying a particular color may not be able to identify text depending on a pair of a background color and a text color. Thus, for example, if a message for such users is displayed on a display screen, the users may not be able to identify the message and may perform an incorrect operation.

SUMMARY OF THE INVENTION

The present invention provides an image generation method for reliably performing color conversion to obtain a color pair which is easy to distinguish for a user to perform displaying or printing.

According to an aspect of the present invention, an image generation method includes printing a plurality of samples and entry fields provided in correspondence with the samples on a sheet, the plurality of samples having different pairs of a background color and a text color, the entry fields being configured to be filled in by a user; reading the sheet on which the plurality of samples and the entry fields are printed to obtain image data; analyzing the obtained image data to check the entry fields; and generating an image in a background color or a text color based on a result of analyzing the obtained image data.

With the image generation method, when screen display or printing is performed, color conversion can be reliably performed to produce a color scheme which is easy to distinguish for a user who has a problem in distinguishing between color tones. Furthermore, color conversion can be reliably performed to produce a color scheme which is desired by a user who has a favorite color scheme.

Further features of the present invention will become apparent from the following description of exemplary embodiments with reference to the attached drawings.

BRIEF DESCRIPTION OF THE DRAWINGS

FIG. 11 is a diagram showing a processing procedure of performing specified color conversion to perform printing in case of providing an automatic color correction function.

DESCRIPTION OF THE EMBODIMENTS

Exemplary embodiments of the present invention will be described in detail with reference to the drawings. The following embodiments are merely illustrative, and are not intended to define the scope of the present invention.

Figure 1:
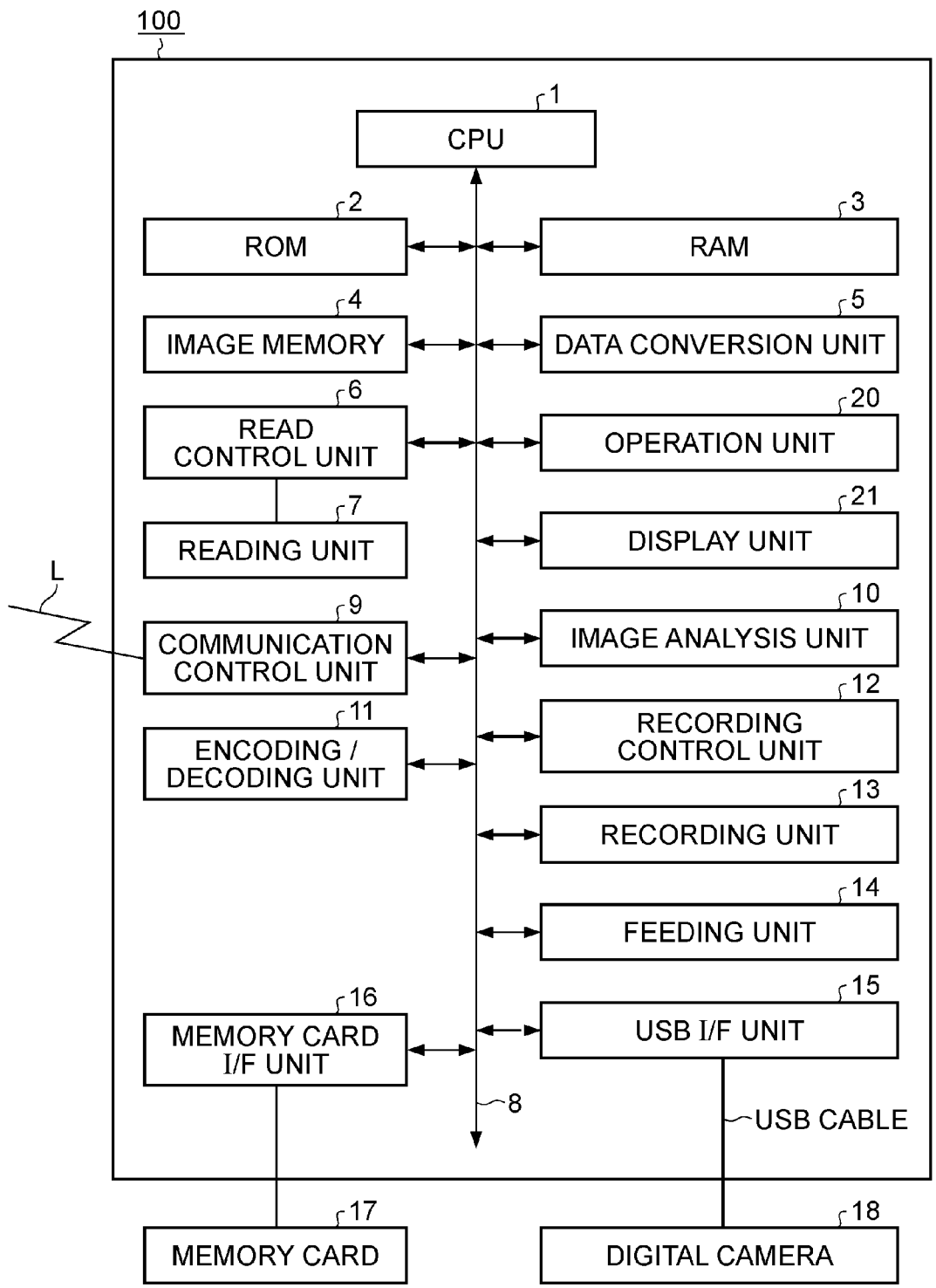
FIG. 1 is a diagram showing a structure of an image processing apparatus.

FIG. 1 is a diagram showing a structure of an image processing apparatus 100.

A central processing unit (CPU) 1 is a system control unit configured to control the overall operation of the image processing apparatus 100.

A read-only memory (ROM) 2 stores control programs executed by the CPU 1 and an incorporated operating system (OS) program. The control programs stored in the ROM 2 are used to perform software control such as scheduling or task switching under control of the incorporated OS program stored in the ROM 2.

The ROM 2 further stores image data of samples (described below) having text superimposed on a background.

A random access memory (RAM) 3 is formed of a static RAM (SRAM) or the like. The RAM 3 stores data such as a setting value registered by a user and management data for the image processing apparatus 100, and includes various buffer areas serving as work areas.

An image memory 4 is formed of a dynamic RAM (DRAM) or the like. Image data is accumulated in the image memory 4.

A data conversion unit 5 converts image data. For example, the data conversion unit 5 interprets a page description language, or expands character data.

A read control unit 6 controls a reading unit 7, and the reading unit 7 optically reads an original using an image sensor provided in the reading unit 7. The thus obtained image data is subjected to various image processing such as binarization or intermediate-tone processing using an image processing control unit (not shown), and is then output.

An operation unit 20 includes various keys, and is operated by a user to input a user's instruction. A display unit 21 includes a display such as a light emitting diode (LED) display or a liquid crystal display (LCD), and is configured to display various types of information such as messages and images on the display. For example, in accordance with a key operation by a user, image printing data is determined, a registration value is set, or the operation conditions or status conditions of the image processing apparatus 100 are displayed.

A communication control unit 9 is connected to an analog communication link (such as a public switched telephone network (PSTN)) L, and controls facsimile communication with an external apparatus.

An image analysis unit 10 analyzes an image read by the reading unit 7.

An encoding/decoding unit 11 encodes or decodes an image handled by the image processing apparatus 100.

A recording control unit 12 performs various types of image processing, such as smoothing processing, recording density correction processing, or color conversion, on image data to be printed, using the image processing control unit (not shown), and outputs the resulting data to a recording unit 13 described below. The recording control unit 12 further controls the recording unit 13 to constantly obtain state information for the recording unit 13.

The recording unit 13 is a printing unit such as a laser beam printer or an ink jet printer, and is configured to print color image data or monochrome image data onto a print medium.

A feeding unit 14 has stacked thereon sheets of paper for printing. The feeding unit 14 feeds the sheets of paper under control of the recording control unit 12.

A universal serial bus (USB) cable is connected to a USB interface (I/F) unit 15 so that communication with an external information terminal apparatus, for example, a digital camera 18, can be performed through the USB interface unit 15.

A memory card 17 is connected to a memory card interface (I/F) unit 16 so that data such as image data can be read from or written to the memory card 17 through the memory card interface unit 16.

The CPU 1, the ROM 2, the RAM 3, the image memory 4, the data conversion unit 5, the read control unit 6, the communication control unit 9, the image analysis unit 10, the encoding/decoding unit 11, the recording control unit 12, the recording unit 13, the feeding unit 14, the USB interface unit 15, the memory card interface unit 16, the operation unit 20, and the display unit 21 are connected to one another via a CPU bus 8 under control of the CPU 1.

Figure 2:
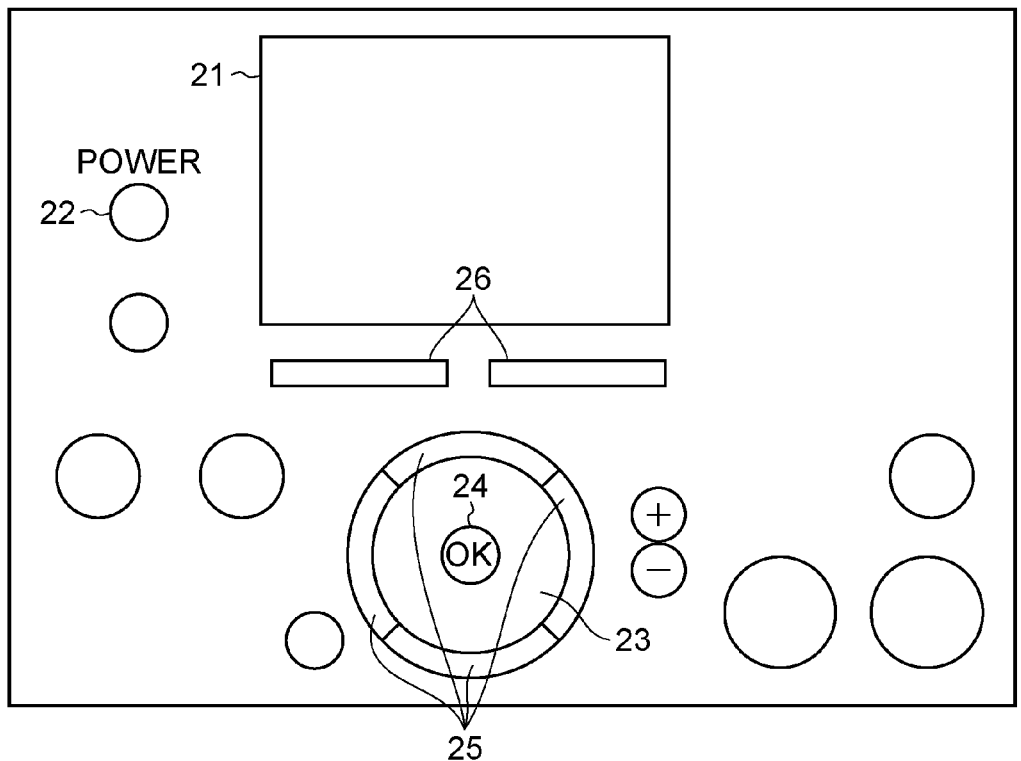
FIG. 2 is an external view of an operation unit and a display unit.

FIG. 2 is an external view of the operation unit 20 and display unit 21 of the image processing apparatus 100.

In FIG. 2, the display unit 21 is incorporated as a part of the operation unit 20.

The keys included in the operation unit 20 will now be described.

A power key 22 is a key used to power on or off the image processing apparatus 100.

A wheel device 23 is a device that is turned to the right or left to input multiple values. A user turns the wheel device 23 to sequentially select images or increase or decrease a set value.

An OK key 24 is a key for determining, for example, an item selected from among a plurality of items in a menu screen displayed on the display unit 21. An up-down-left-right key 25 is usable to move an item up, down, right, or left. For example, the up-down-left-right key 25 is used to move a focused position of an item or to change a value.

Function keys 26 are keys that are assigned functions displayed on a screen. Items corresponding to the function keys 26 are displayed on the display unit 21, and a user presses one of the function keys 26 corresponding to the displayed items. The function keys 26 are assigned different functions depending on a screen.

Figure 3:
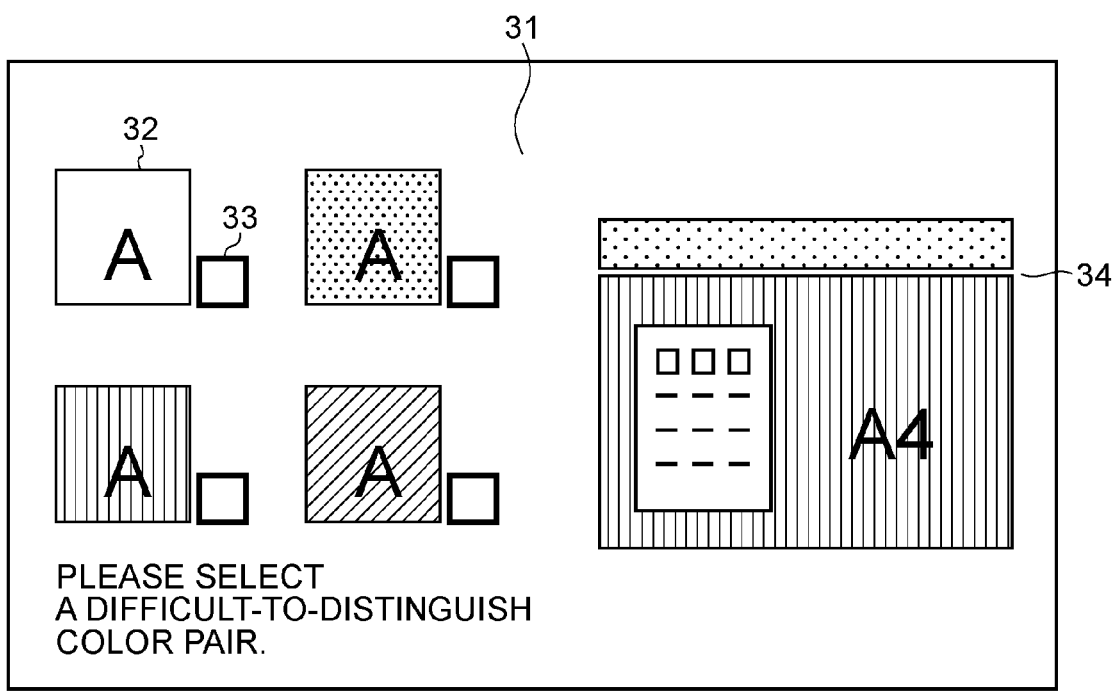
FIG. 3 is a diagram showing an example of a first color-conversion sheet.

FIG. 3 is a diagram showing an example of a first color-conversion sheet 31.

The sheet 31 is printed by the recording unit 13 of the image processing apparatus 100, and is filled in by a user. Then, the sheet 31 is read by the reading unit 7. The details are described below.

The sheet 31 has samples 32 each showing a pair of a background color and a text color, which is used for displaying on the display unit 21 of the image processing apparatus 100. The sheet 31 also has an entry field 33 provided in correspondence with each of the samples 32. A user can select one of the samples 32 by filling in one of the entry fields 33 that corresponds to the selected sample 32. Each of the samples 32 is paired with a corresponding one of the entry fields 33, and a plurality of such pairs are printed side-by-side. A user can compare the plurality of samples to select a difficult-to-read sample.

A display image 34 is an example image displayed by the image processing apparatus 100. The image 34 is printed in a default display color pair. A user can assume a default display color pair when the user fills in the sheet 31.

In the present embodiment, as for the samples 32, pairs of background colors and text colors are printed. However, any other pair may be printed as long as a user can select a difficult-to-distinguish color pair.

Figure 4:
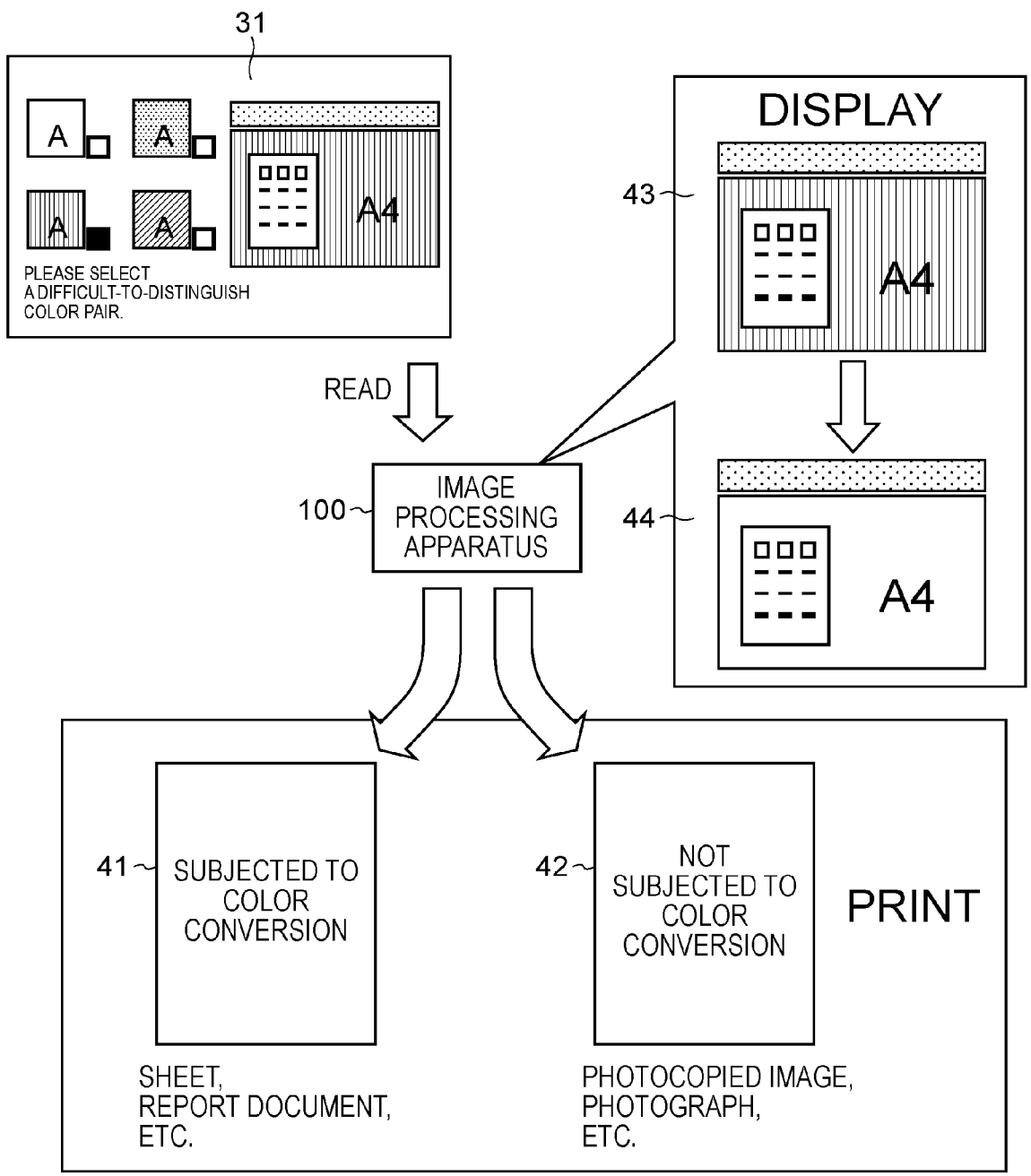
FIG. 4 is a diagram showing an example of color conversion performed using the first color-conversion sheet.

FIG. 4 is a diagram showing an example of color conversion processing performed using the first color-conversion sheet 31.

In order to perform the color conversion processing, first, the first color-conversion sheet 31 is printed from the recording unit 13.

A user selects a difficult-to-read sample from among samples provided on the printed first color-conversion sheet 31, and fills in an entry field corresponding to the selected sample. Then, the first color-conversion sheet 31 that has been filled in is read by the reading unit 7 of the image processing apparatus 100, and resulting image data is analyzed by the image analysis unit 10 to determine whether or not each of the entry fields has been filled in. The image processing apparatus 100 can therefore recognize a sample that is difficult for the user to read, and perform color conversion based on the color pair of the difficult-to-read sample to generate display data or print data.

Printed objects 41 and 42 are example printed objects. The printed object 41 is a sheet or a report document, and is subjected to color conversion. The printed object 42 is a photocopied image or a photograph, and is not subjected to color conversion. In this manner, the determination of whether or not color conversion is necessary is set in advance depending on data to be printed, and only data that requires color conversion is subjected to color conversion and is then printed. Data to be printed that requires color conversion may be selected on, for example, a display screen by a user, or may be set in advance in the image processing apparatus 100.

A display example 43 shows an image not subjected to color conversion, and a display example 44 shows an image subjected to color conversion. In the display example 44, the pair of a background color and a text color of the difficult-to-read sample selected by the user is not used.

In FIG. 4, the user fills in one of the entry fields. Alternatively, the image processing apparatus 100 may prompt a user to check one of the entry fields with a sign such as a check mark or cross mark if the image processing apparatus 100 is capable of identifying the sign.

In the foregoing description, a user selects a difficult-to-read sample. Alternatively, a user may select a sample having his/her favorite color scheme to perform displaying or printing in a color scheme which is desired by the user.

Next, a color-conversion sheet different from the first color-conversion sheet 31 will be described.

Figure 5:
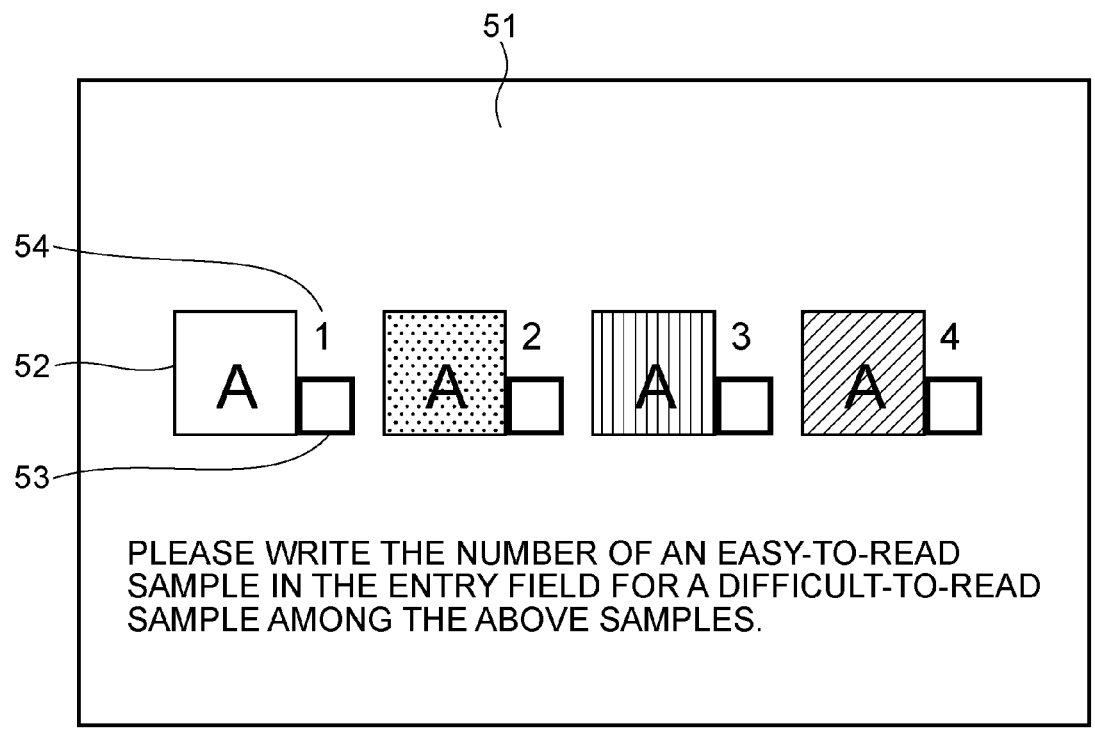
FIG. 5 is a diagram showing an example of a second color-conversion sheet.

FIG. 5 is a diagram showing an example of a second color-conversion sheet 51.

On the second color-conversion sheet 51, samples 52 each showing a pair of a background color and a text color, number entry fields 53 provided in correspondence with the samples 52, and numbers 54 assigned to the samples 52 are printed.

The samples 52 are similar to the samples 32 printed on the first color-conversion sheet 31, and are samples each showing a pair of a background color and a text color, which is used for displaying or printing. The number entry fields 53 may be filled in by a user with the numbers 54 assigned to the samples 52.

The user selects an easy-to-read sample from among the samples 52, and writes the number assigned to the selected sample in one of the number entry fields 53 that corresponds to a difficult-to-read sample. For example, if a user has difficulty reading the third sample but can easily read the first sample, the number associated with the easy-to-read sample ("1") is entered into the box of the difficult-to-read sample.

When the filled-in sheet 51 is read, the image analysis unit 10 analyzes image data of the sheet 51 to identify the number written in the number entry field. As a result of the identification, the sample that is difficult to read for the user and the sample that is easy to read for the user are determined. If the pair of a background color and text color of the difficult-to-read sample is a default color pair, color conversion is performed to produce a color pair which is easy to distinguish for the user.

A specific color correction operation of the display unit 21 of the image processing apparatus 100 according to the first embodiment will now be described.

Figure 6:
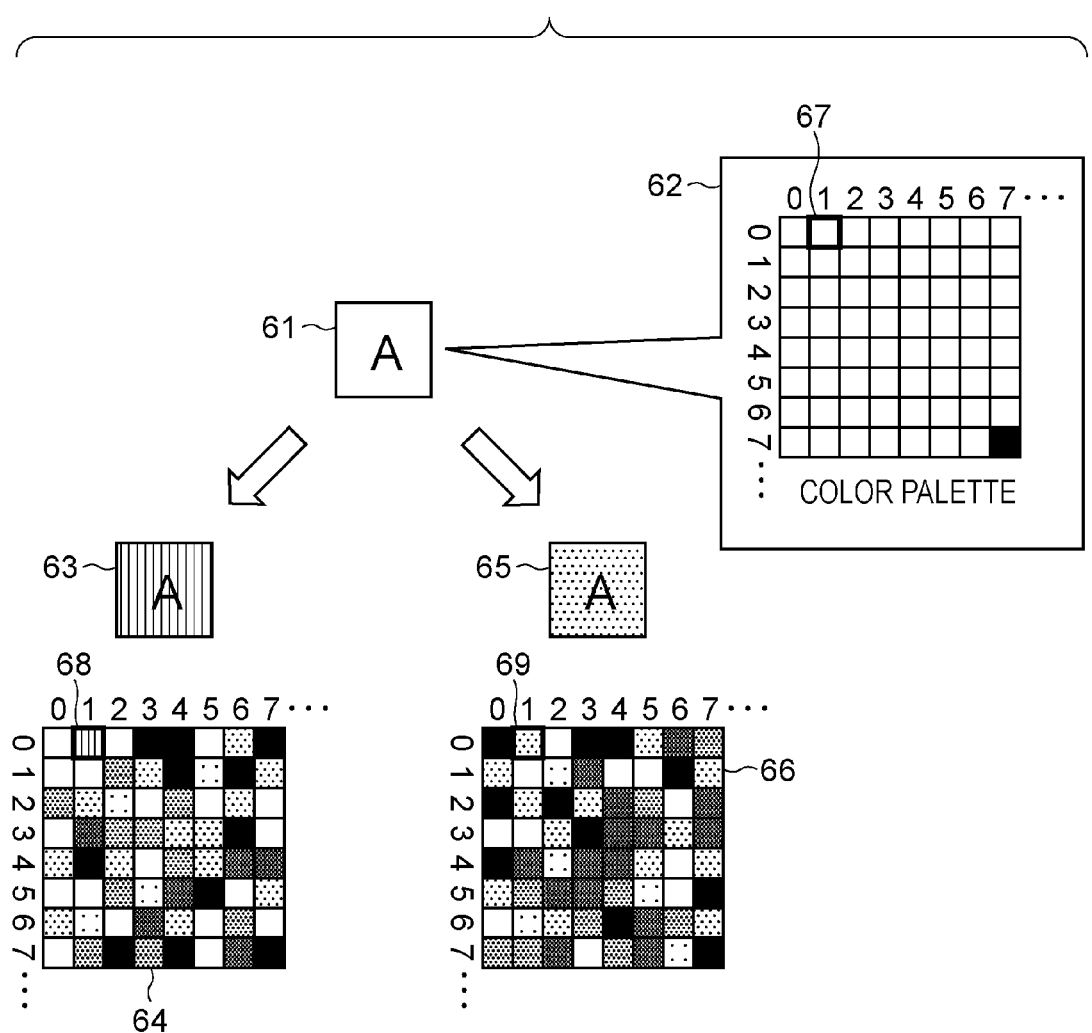
FIG. 6 is a diagram showing palette conversion.

FIG. 6 is a diagram showing palette conversion processing, which is an example of the color conversion processing.

A bitmap image file (hereinafter referred to as a "BMP") 61 for defining a background color and a text color is image data having a color palette 62. The BMP 61 is configured such that a background color and a text color are displayed on the basis of a predetermined color palette code.

A plurality of color palettes are stored in the ROM 2. If a color palette to be used is changed by the CPU 1, a color pair can be changed without changing a code by which a table is referred to. For example, color data 67, which is defined by horizontal position 1 and vertical position 0 of the color palette 62, is used as a background color of the BMP 61. In this case, if the color palette 62 is replaced with a color palette 64, color data 68 shown in FIG. 6 is used as a background color since the position to be referred to on the color palette is not changed. Thus, the displayed image is changed to an image 63 shown in FIG. 6. Similarly, if the color palette 62 is changed to a color palette 66, color data 69 is used as a background color, and the displayed image is changed to an image 65 shown in FIG. 6. This operation is called palette conversion. The color of text can also be changed using palette conversion.

The color conversion processing described above based on the first or second color-conversion sheet 31 or 51 is implemented using this palette conversion. That is, a sheet is read, and a color palette for a background color or text color of a sample that is determined to be difficult to read for a user is changed to another color palette, thus changing an output color pair without changing a BMP.

While a color conversion method based on palette conversion has been described, this color conversion method is merely illustrative and any other color conversion method may be used.

Figure 7:
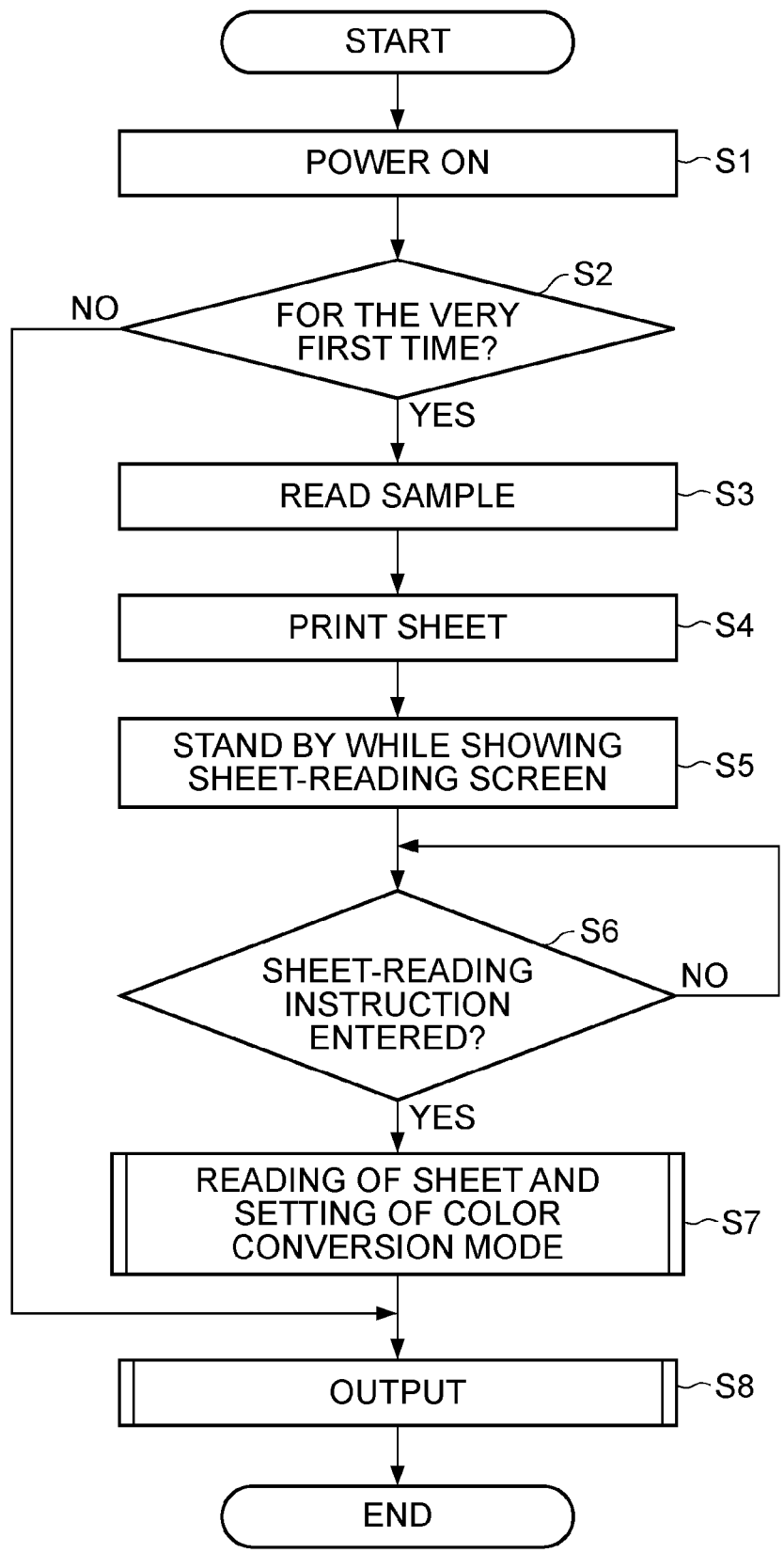
FIG. 7 is a diagram showing a processing procedure of printing the first color-conversion sheet and reading the printed first color-conversion sheet.

FIG. 7 is a diagram showing a series of operations of printing the first color-conversion sheet 31, reading the first color-conversion sheet 31, and performing color conversion based on the read sheet 31. The series of operations is controlled by the CPU 1.

In step S1, the image processing apparatus 100 is powered on. In step S2, it is determined whether or not the image processing apparatus 100 was started for the very first time. The term "for the very first time" means a state where a user turns on the power of a product for the first time after the product was shipped. That is, in step S2, it is determined whether or not a product was powered on for the first time after the user purchased or acquired the product. If it is determined that the image processing apparatus 100 was started for the very first time, the process proceeds to S3. If it is determined in step S2 that the image processing apparatus 100 was not started for the very first time, the process proceeds to step S8.

In step S3, an image used as a sample is read from the ROM 2. In step S4, a sheet is printed by the recording unit 13. In step S5, a screen for notifying the user of the reading of the filled-in sheet is displayed on the display unit 21 and then the process stands by. In step S6, it is determined whether or not the user has set the sheet in the reading unit 7 and has entered an instruction to read the sheet.

In step S7, the sheet is read and each of the entry fields on the sheet is analyzed. A color conversion mode is set (stored) on the basis of the analysis result. The details are described below with reference to FIG. 8.

In step S8, color conversion is performed according to the color conversion mode set in step S7, and an image is output. That is, an image is displayed on the screen or is printed. The details are described below with reference to FIGS. 9 and 10.

Figure 8:
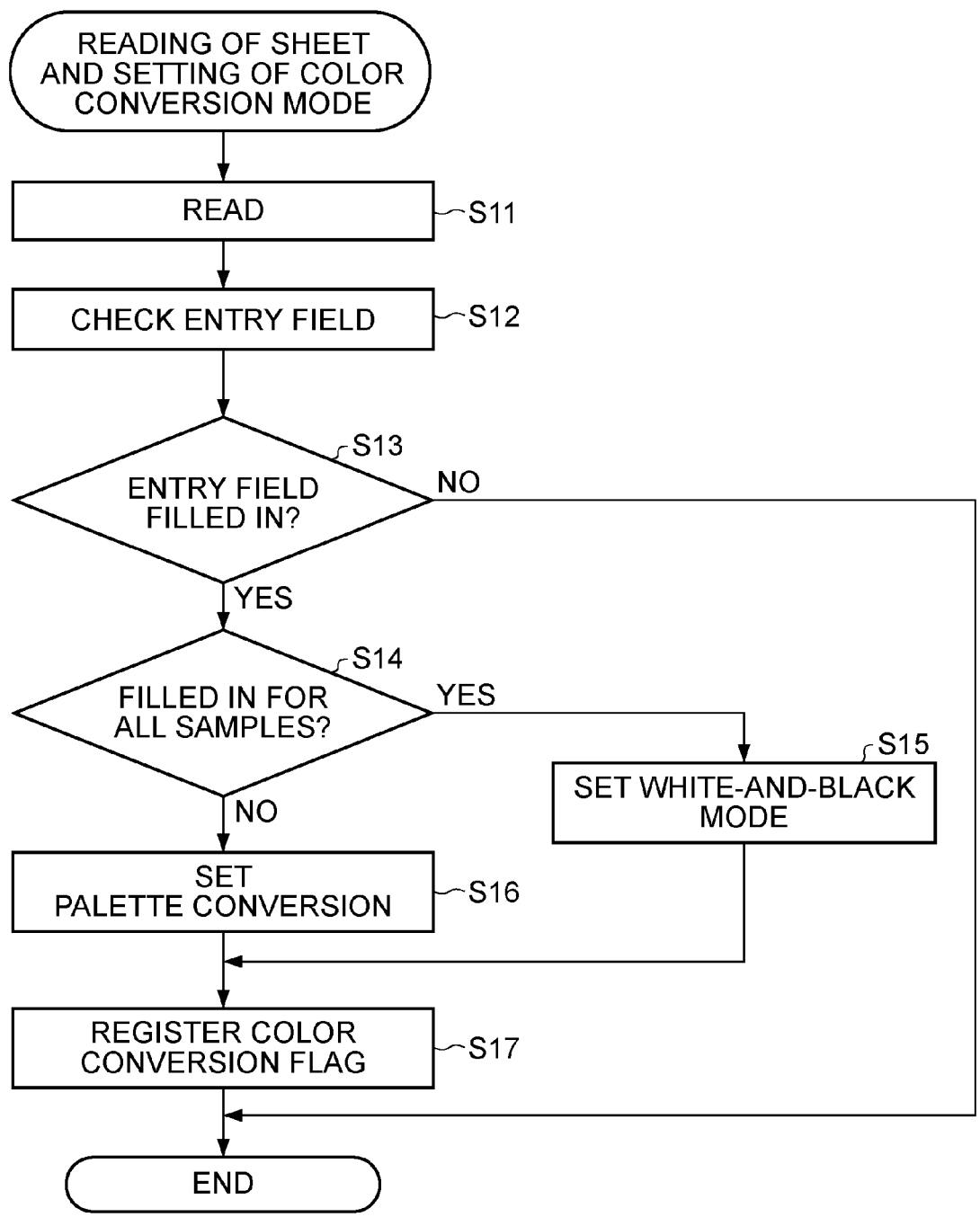
FIG. 8 is a diagram showing a processing procedure of reading the first color-conversion sheet and setting a color conversion mode.

FIG. 8 is a flowchart showing the details of the processing of step S7 shown in FIG. 7, and is a diagram showing a processing procedure for the image processing apparatus 100 to read the first color-conversion sheet 31 to set a color conversion mode.

First, in step S11, the reading unit 7 reads the first color-conversion sheet 31 to obtain image data. In step S12, the image data obtained in step S11 is analyzed to determine which entry field among the entry fields printed on the sheet has been filled in.

In step S13, it is determined whether or not a filled-in entry field is found on the basis of the analysis result obtained in step S12. If it is determined that a filled-in entry field is not found, the process ends without setting a color conversion mode. If it is determined that a filled-in entry field is found, the process proceeds to step S14.

In step S14, it is determined whether or not all the entry fields have been filled in on the basis of the determination result obtained in step S13. If it is determined that all the entry fields have been filled in, the process proceeds to step S15, in which a black-and-white mode is set as a color conversion mode. In this case, an image is displayed or printed in black and white, resulting in an improvement in the vision of a user who finds it difficult to read all the samples.

If it is determined in step S14 that an unfilled-in entry field is found, the process proceeds to step S16, in which a palette conversion is set as a color conversion mode. In this case, a color palette to be used for displaying or printing is determined in accordance with the filled-in entry field.

In step S17, a color conversion flag indicating that a color conversion mode has been set in step S15 or S16 is registered. The color conversion flag is used in a process shown in FIGS. 9 and 10, which will be described below.

If the second color-conversion sheet 51 shown in FIG. 5 is used, in step S13, it is determined whether or not each of the entry fields has been filled in with a number, and the numbers are determined.

Figure 9:
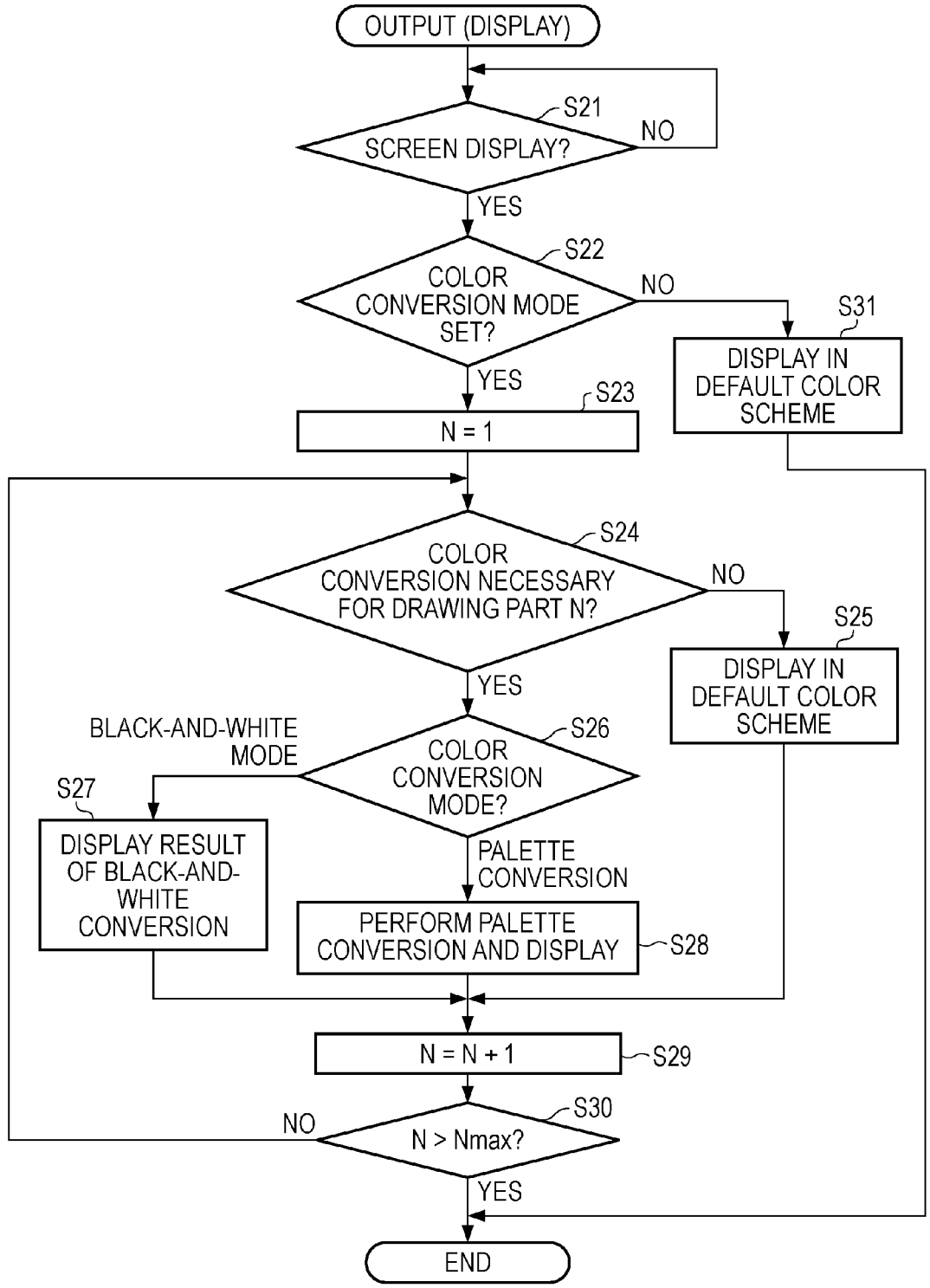
FIG. 9 is a diagram showing a processing procedure of performing specified color conversion to perform screen display.

FIG. 9 is a diagram showing the details of the processing of step S8 shown in FIG. 7, and is a diagram showing a processing procedure of performing color conversion specified according to the flow shown in FIG. 8 to perform screen display.

First, in step S21, it is determined whether or not screen display is to be performed. That is, it is determined whether or not it is ready for displaying. For example, it is determined whether or not an instruction has been entered from a user through the operation unit 20 or whether or not image data has been input from an external apparatus connected through the USB interface unit 15. If it is determined in step S21 that screen display is to be performed, in step S22, it is determined whether or not a color conversion mode has been set. The determination of whether or not a color conversion mode has been set is performed by determining whether or not the color conversion flag described above has been registered. If a color conversion mode has not been set, the process proceeds to step S31, in which an image is displayed in a default color scheme. Then, the process ends. If a color conversion mode has been set, the process proceeds to step S23, in which a part number N is initialized. The part number N is a number assigned to each part displayed on the display unit 21, and a value Nmax is a value indicating a total number of parts used on a display screen. For example, in the display example 43 shown in FIG. 4, paper size "A4" and a bitmap of an image to be printed and the background of the display are parts on the screen. Accordingly, Nmax is 3 because there are 3 parts to be displayed.

In step S24, it is determined whether or not color conversion is necessary for a drawing part N.

If color conversion is not necessary, in step S25, an image (of part N) is displayed in a default color scheme. Then, the process proceeds to step S29. If it is determined in step S24 that color conversion for part N is necessary, in step S26, the type of the set color conversion mode is determined.

If it is determined in step S26 that a black-and-white mode has been set, in step S27, a result obtained by performing black-and-white conversion on the part N is displayed on the display unit 21. Then, the process proceeds to step S29.

If it is determined in step S26 that a palette conversion has been set, the process proceeds to step S28, in which the current color palette is changed to the color palette determined in step S16 shown in FIG. 8 to generate display data for part N, and the display data is displayed.

In step S29, the value N is incremented by one to perform similar processing on a subsequent part. Then, the process proceeds to step S30. In step S30, it is determined whether or not the value N is greater than the value Nmax. If the value N is not greater than the value Nmax, there remains a part that has not yet been displayed and the process returns to step S24, and a process for displaying a subsequent part is performed. If the value N is greater than the value Nmax, the process ends.

According to the processing procedure shown in FIG. 9, the color conversion set according to the process described with reference to FIG. 8 is performed to display an image.

In the present invention, a user refers to a sheet and selects a difficult-to-read sample. As shown in FIG. 9, in case of performing color conversion for a display screen, a sample may be selected on the display screen. However, a display screen provided on a printer generally has a small size. If a plurality of samples such as the samples described with reference to FIG. 3 are displayed, the size of the displayed samples is also small. In this case, it is difficult for a user to select a difficult-to-read sample from among the samples, and the user may erroneously select a display color pair that is not a difficult-to-distinguish color pair.

In the present invention, however, since samples are printed on a sheet, larger samples than the samples displayed on a screen can be output. Furthermore, these samples may be printed on a plurality of sheets so that a large number of large-size samples can be output.

Figure 10:
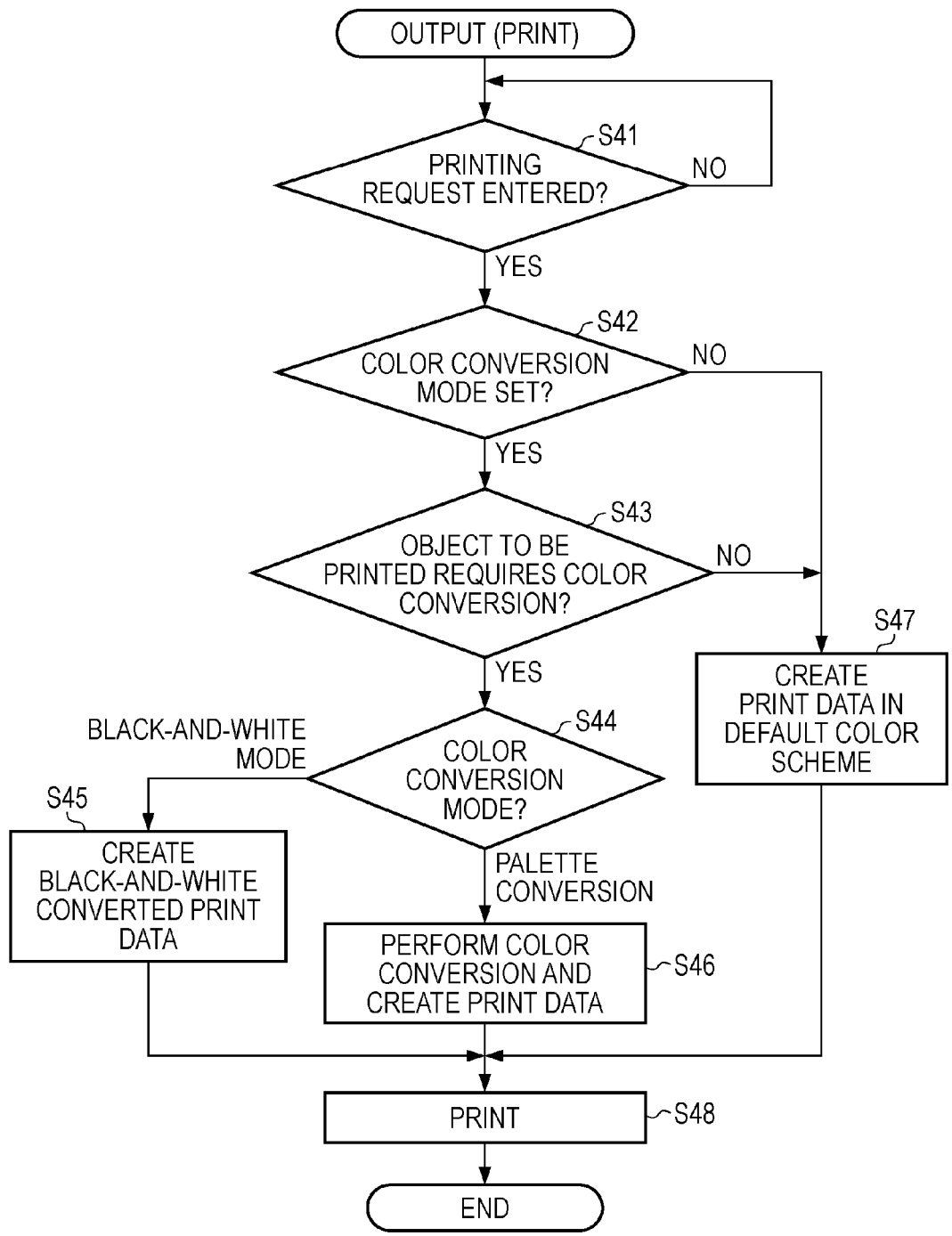
FIG. 10 is a diagram showing a processing procedure of performing specified color conversion to perform printing.

FIG. 10 is a diagram showing the details of the processing of step S8 shown in FIG. 7, and is a diagram showing a processing procedure of performing the color conversion specified according to the processing procedure shown in FIG. 8 to perform printing.

First, in step S41, it is determined whether or not printing is to be performed. That is, it is determined whether or not it is ready for printing. For example, it is determined whether or not an instruction has been entered from a user through the operation unit 20 or whether or not a printing request has been issued from an external apparatus connected through the USB interface unit 15 or the communication link L.

In step S42, it is determined whether or not the color conversion flag described above has been registered to determine whether or not a color conversion mode has been set. If a color conversion mode has been set, the process proceeds to step S43. If a color conversion mode has not been set, the process proceeds to step S47, in which print data is generated in a default color scheme. In step S48, the print data is printed. Then, the process ends.

If it is determined in step S42 that a color conversion mode has been set, the process proceeds to step S43, in which it is determined whether or not color conversion is necessary by determining whether or not an object to be printed is set to require color conversion. If it is determined that color conversion is not necessary, in step S47, print data is generated in a default color scheme. In step S48, the print data is printed. Then, the process ends. If it is determined in step S43 that color conversion is necessary, in step S44, the type of the set color conversion mode is determined.

If it is determined in step S44 that a black-and-white mode has been set, in step S45, print data subjected to black-and-white conversion is generated. In step S48, the print data is printed.

If it is determined in step S44 that a palette conversion has been set, the process proceeds to step S46, in which the current color palette is changed to the color palette determined in step S16 shown in FIG. 8 to generate print data. In step S48, the print data is printed. In the process shown in FIG. 10, a notification indicating that the printed object is a printed object subjected to color conversion may be displayed.

While the above-described embodiment only performs the series of operations of printing the first color-conversion sheet 31, reading the first color-conversion sheet 31, and performing color conversion based on the read sheet 31, shown in FIG. 7, the very first time the image processing apparatus 100 is powered on, it will be appreciated that this processing may be performed at other time, e.g., upon user request.

Another embodiment of the present invention provides a process in case of providing an automatic color correction function of automatically performing color correction for an object to be printed when color conversion is performed to perform printing.

A process for performing an operation using the function of automatically correcting a photograph and color conversion using a sheet according to the present embodiment will be described with reference to FIG. 11. In the following description, the automatic correction operation is an operation of automatically performing a plurality of corrections for a printing result, such as red-eye correction or color-tone correction, for example, during printing of a photograph.

FIG. 11 is a diagram showing a processing procedure of performing specified color conversion to perform printing in case of providing an automatic color correction function. An operation similar to that shown in FIG. 10 will not be discussed in detail herein.

First, in step S51, it is determined whether or not printing is to be performed. In step S52, it is determined whether or not the color conversion flag has been registered to determine whether or not a color conversion mode has been set.

If a color conversion mode has been set, the process proceeds to step S53. If a color conversion mode has not been set, the process proceeds to step S59, in which it is determined whether or not an automatic correction function has been set.

If it is determined in step S59 that the automatic correction function has been set, the process proceeds to step S60, in which automatically corrected print data is generated. In step S62, the print data is printed. If the automatic correction function is not set, the process proceeds to step S61, in which print data is generated in a default color scheme. In step S62, the print data is printed.

If it is determined in step S52 that a color conversion mode has been set, in step S53, it is determined whether or not the object to be printed requires color conversion. Here, it is determined whether or not the object to be printed is a photograph. If it is determined in step S53 that color conversion is not necessary, the process proceeds to step S59. If it is determined in step S53 that color conversion is necessary, the process proceeds to step S54.

In step S54, it is determined whether or not the automatic correction function has been set. If the automatic correction function has been set, the process proceeds to step S55, in which image data of the object to be printed is automatically corrected. Then, the process proceeds to step S56.

In step S56, the type of the set color conversion mode it is determined. If it is determined in step S56 that a black-and-white mode has been set, in step S57, print data subjected to black-and-white conversion is generated. In step S62, the print data is printed. If it is determined in step S56 that a palette conversion has been set, in step S58, color conversion based on the color palette determined in step S16 shown in FIG. 8 is performed to generate print data. Then, the process proceeds to step S62, in which the print data is printed.

The present embodiment is an embodiment in which color conversion using a sheet is performed in combination with automatic correction in the printing process. According to the present embodiment, even in a case where automatic correction has been set, color conversion using a color-conversion sheet can be performed in combination with the set automatic correction.

According to the present invention, therefore, a user can view samples printed on a sheet and can select a sample. Thus, even if default colors are difficult-to-distinguish colors, the colors can be reliably changed to easy-to-distinguish colors to perform displaying or printing. In particular, with the use of samples each showing a background and text pair, text can be displayed or printed in a manner easily recognizable to a user.

Furthermore, in a case where a user desires to display or print an image in a desired color scheme, color conversion can be reliably performed.

Moreover, in case of providing an automatic color correction function of automatically correcting a color of an object to be printed, color conversion can be performed in combination with the automatic color correction function.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Application No. 2007-161953 filed Jun. 19, 2007, which is hereby incorporated by reference herein in its entirety.

What is claimed is:

1. An image processing apparatus comprising:
   a determining unit configured to determine a restriction color of which use is restricted, in accordance with an instruction by a user;
   a specifying unit configured to specify whether the restriction color determined by the determining unit is used in an image to be output, by analyzing data corresponding to the image;
   a decision unit configured to decide whether a type of the image to be output corresponds to a predetermined type of an image in which the restriction color is changed;
   a changing unit configured to change the restriction color in the image to another color; and
   an outputting unit configured to output the image to be output; and
   at least one processor configured to function as the determining unit, the specifying unit, the decision unit, the changing unit, and the outputting unit,
   wherein the outputting unit is configured to output the image in which the restriction color is changed by the changing unit, in a case where the specifying unit specifies that the restriction color is used in the image and the decision unit decides that the type of the image corresponds to the predetermined type, and output the image in which the restriction color is not changed, in a case where the decision unit does not decide that the type of the image corresponds to the predetermined type.

2. The image processing apparatus according to claim 1, wherein the specifying unit specifies an area, corresponding to the restriction color, of the image, and in a case where the area is specified by the specifying unit, the changing unit changes the restriction color in the area to a color different from the restriction color.

3. The image processing apparatus according to claim 1, wherein the changing unit changes the restriction color in the image into a color designated by the user.

4. The image processing apparatus according to claim 1, wherein the outputting unit is configured to output the image, by using a display apparatus or a printing apparatus.

5. The image processing apparatus according to claim 1, wherein an image of the predetermined type does not include a photograph, and in a case where the image to be output includes the photograph, even if the specifying unit can specify that the restriction color is used in the image to be output, the changing unit does not change the restriction color in the image to be output.

6. The image processing apparatus according to claim 1, further comprising a setting unit configured to set a type of an image in which the restriction color is changed by the changing unit, as the predetermined type, in accordance with an instruction by a user,
wherein the at least one processor is configured to function as the setting unit, and the changing unit does not change the restriction color in the image to be output, in a case where a type of the image is not set as the type by the setting unit.

7. The image processing apparatus according to claim 1, further comprising a showing unit configured to show a plurality of samples each using a different candidate color which is a candidate of the restriction color of which use is restricted, to the user;
wherein the at least one processor is configured to function as the showing unit, and the determining unit is configured to determine a candidate color which is used by a sample selected by the user from the plurality of samples shown by the showing unit, as the restriction color.

8. The image processing apparatus according to claim 7, wherein in a case where it is determined that all the plurality of samples showed by the showing unit have been selected by the user, the changing unit changes a color of the image to a black-and-white image.

9. The image processing apparatus according to claim 7, wherein each of the plurality of samples represents a combination of a plurality of colors,
wherein the determining unit determines a combination which corresponds to a combination of a sample designated by the user as a restriction combination, and
wherein the changing unit changes at least the restriction combination determined by the determining unit to another combination.

10. The image processing apparatus according to claim 7, wherein the showing unit shows the plurality of samples, for changing of a color of the image by the changing unit, by using an output apparatus to be used in outputting of the image.

11. The image processing apparatus according to claim 7, wherein the showing unit is configured to show the plurality of samples, by causing a printing apparatus to print the plurality of samples or by causing a display apparatus to display the plurality of samples.

12. The image processing apparatus according to claim 1, wherein the predetermined type is different from a copied image.

13. An image processing method comprising steps of:
determining a restriction color of which use is restricted, using a processor, in accordance with an instruction by a user;
specifying whether the restriction color determined in the determining step is used in an image to be output, by analyzing data corresponding to the image;
deciding whether a type of the image to be output corresponds to a predetermined type of an image in which the restriction color is to be changed;
changing the restriction color in the image to another color; and
outputting the image to be output,
wherein the outputting step outputs the image in which the restriction color is changed by the changing step, in a case where the specifying step specifies that the restriction color is used in the image and the deciding step decides that the type of the image corresponds to the predetermined type, and outputs the image in which the restriction color is not changed, in a case where the specifying step does not specify that the restriction color is used in the image or the deciding step does not decide that the type of the image corresponds to the predetermined type.

14. A non-transitory computer readable storage medium storing a program causing a computer to perform a method comprising steps of:
determining a restriction color of which use is restricted in accordance with an instruction by a user;
specifying whether the restriction color determined in the determining step is used in an image to be output, by analyzing data corresponding to the image;
deciding whether a type of the image to be output corresponds to a predetermined type of an image in which the restriction color is to be changed; and
changing the restriction color in the image to another color; and
outputting the image to be output,
wherein the outputting step outputs the image in which the restriction color is changed by the changing step, in a case where the specifying step specifies that the restriction color is used in the image and the deciding step decides that the type of the image corresponds to the predetermined type, and outputs the image in which the restriction color is not changed, in a case where the specifying step does not specify that the restriction color is used in the image or the deciding step does not decide that the type of the image corresponds to the predetermined type.

15. An image processing apparatus comprising:
a specifying unit configured to specify whether a restriction color of which use is restricted, is used in an image to be output, by analyzing data corresponding to the image;
a decision unit configured to decide whether a type of the image to be output corresponds to a predetermined type of an image in which the restriction color is changed;
a changing unit configured to change the restriction color in the image to another color;
an outputting unit configured to output the image to be output; and
at least one processor configured to function as the specifying unit, the decision unit, the changing unit, and the outputting unit,
wherein the outputting unit is configured to output the image in which the restriction color is changed by the changing unit, in a case where the specifying unit specifies that the restriction color is used in the image and the decision unit decides that the type of the image corresponds to the predetermined type, and output the image in which the restriction color is not changed, in a case where the decision unit does not decide that the type of the image corresponds to the predetermined type.

16. The image processing apparatus according to claim 15, further comprising an inputting unit configured to input the restriction color, in accordance with an instruction by a user, wherein the at least one processor is configured to function as the inputting unit, and the specifying unit specifies whether the restriction color input by the inputting unit is used in the image to be output.

\* \* \* \* \*